Oct. 10, 1967  A. R. LUDWIG  3,346,183
NUMERICAL CONTROL SYSTEM
Original Filed Sept. 2, 1964  5 Sheets-Sheet 1

INVENTOR
ALBERT R. LUDWIG
BY McNenny, Farrington, Pearne & Gordon
ATTORNEYS

Oct. 10, 1967  A. R. LUDWIG  3,346,183
NUMERICAL CONTROL SYSTEM
Original Filed Sept. 2, 1964  5 Sheets-Sheet 2

INVENTOR.
ALBERT R. LUDWIG
BY
McNenny, Farrington, Pearne & Gordon
ATTORNEYS

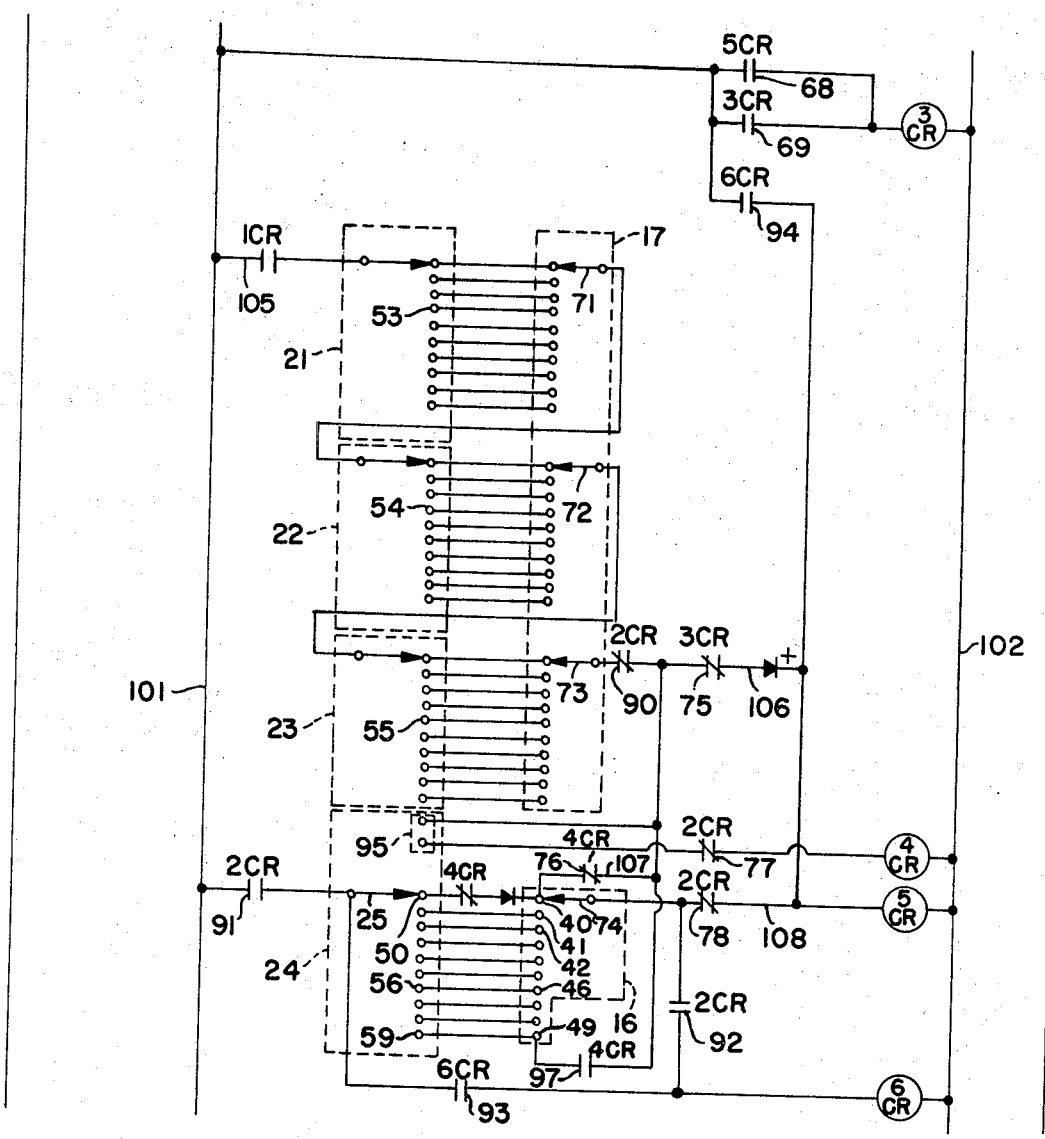

Oct. 10, 1967             A. R. LUDWIG             3,346,183
NUMERICAL CONTROL SYSTEM
Original Filed Sept. 2, 1964             5 Sheets-Sheet 4
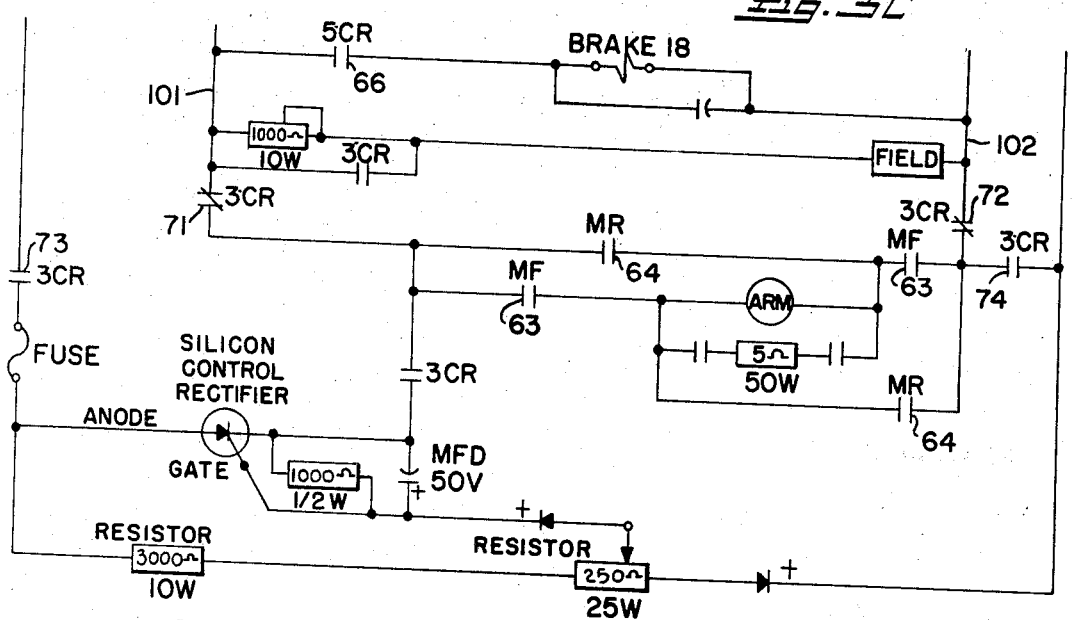
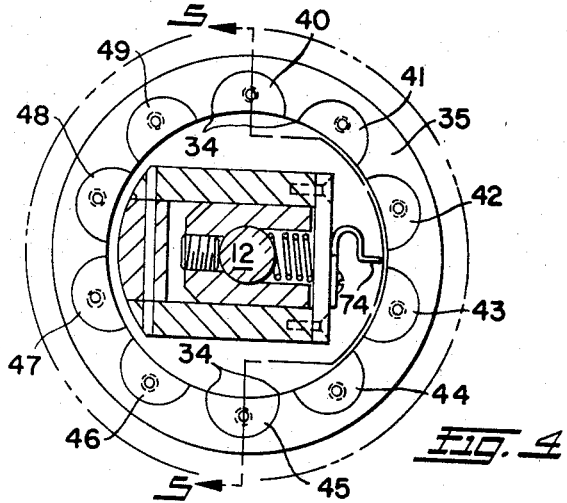
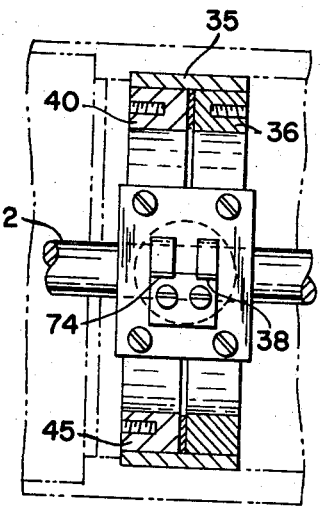
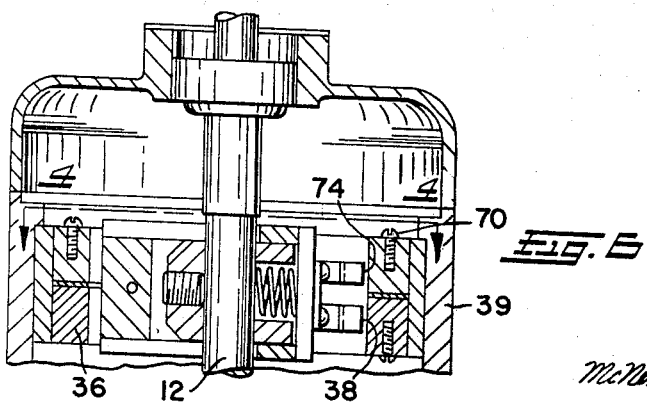
INVENTOR.
ALBERT R. LUDWIG
BY
McNenny, Farrington, Pearne & Gordon
ATTORNEYS Oct. 10, 1967
A. R. LUDWIG
3,346,183
NUMERICAL CONTROL SYSTEM
Original Filed Sept. 2, 1964
5 Sheets-Sheet 5
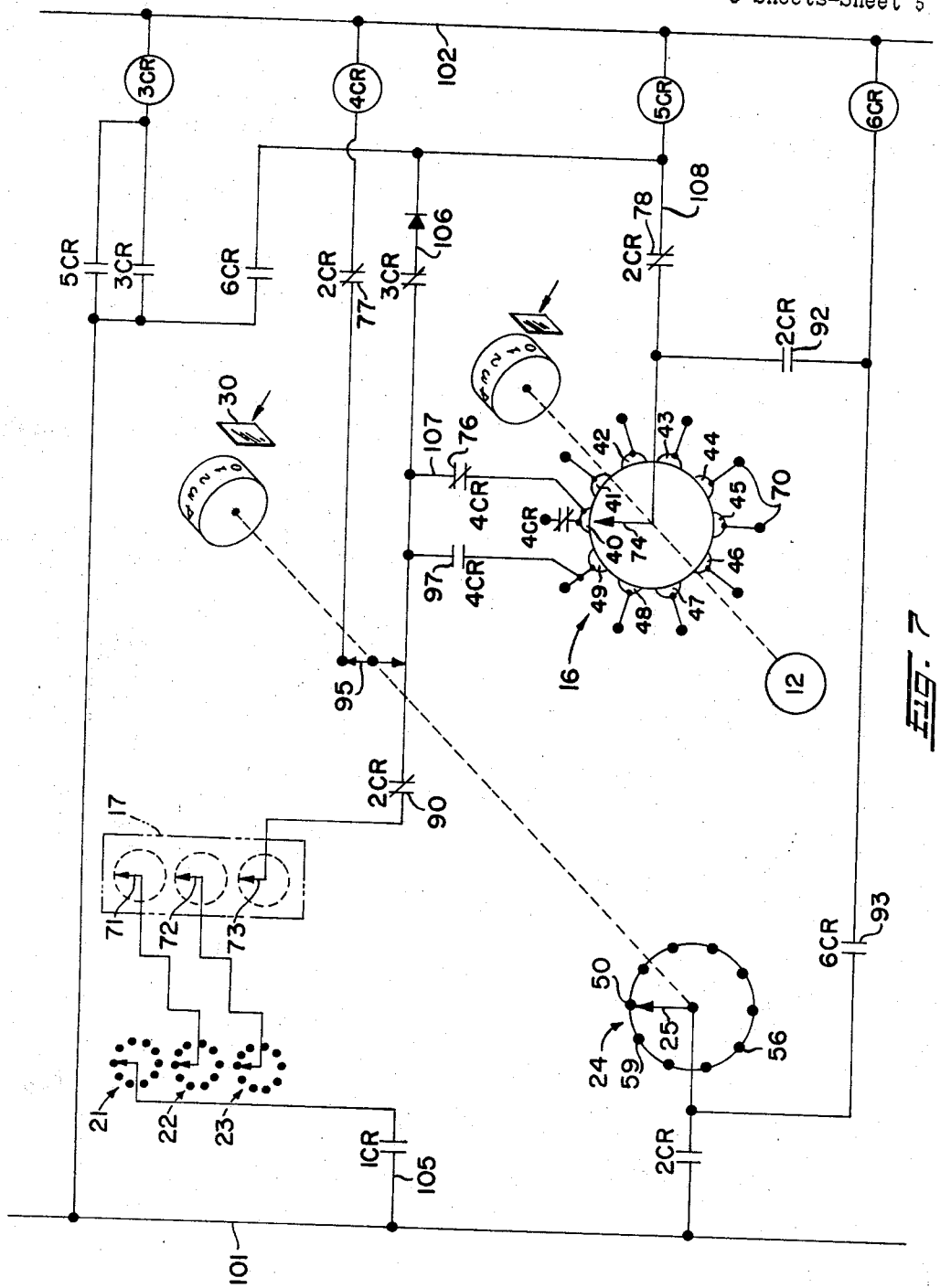
INVENTOR.
ALBERT R. LUDWIG
BY
McNenny, Farrington, Pearne & Gordon
ATTORNEYS

United States Patent Office 3,346,183
Patented Oct. 10, 1967

3,346,183
NUMERICAL CONTROL SYSTEM
Albert R. Ludwig, Timberlake, Ohio, assignor to Zagar, Inc., Cleveland, Ohio, a corporation of Ohio
Continuation of application Ser. No. 393,999, Sept. 2, 1964. This application Jan. 17, 1966, Ser. No. 532,029
4 Claims. (Cl. 235—91)

ABSTRACT OF THE DISCLOSURE

An apparatus for numerically controlling the rotative displacement of a shaft from a datum position which includes a control circuit for phasing a spurious base count ahead of an actual base count, and when the spurious base count compares with the base count of the numerical identification, counting a predetermined units count phased ahead of the units count of the numerical identification, and upon achievement of such predetermined units count initiating completion of the shaft movement to finally move the shaft just onto the desired units count in a predetermined rotative direction.

---

Figures 1, 2:
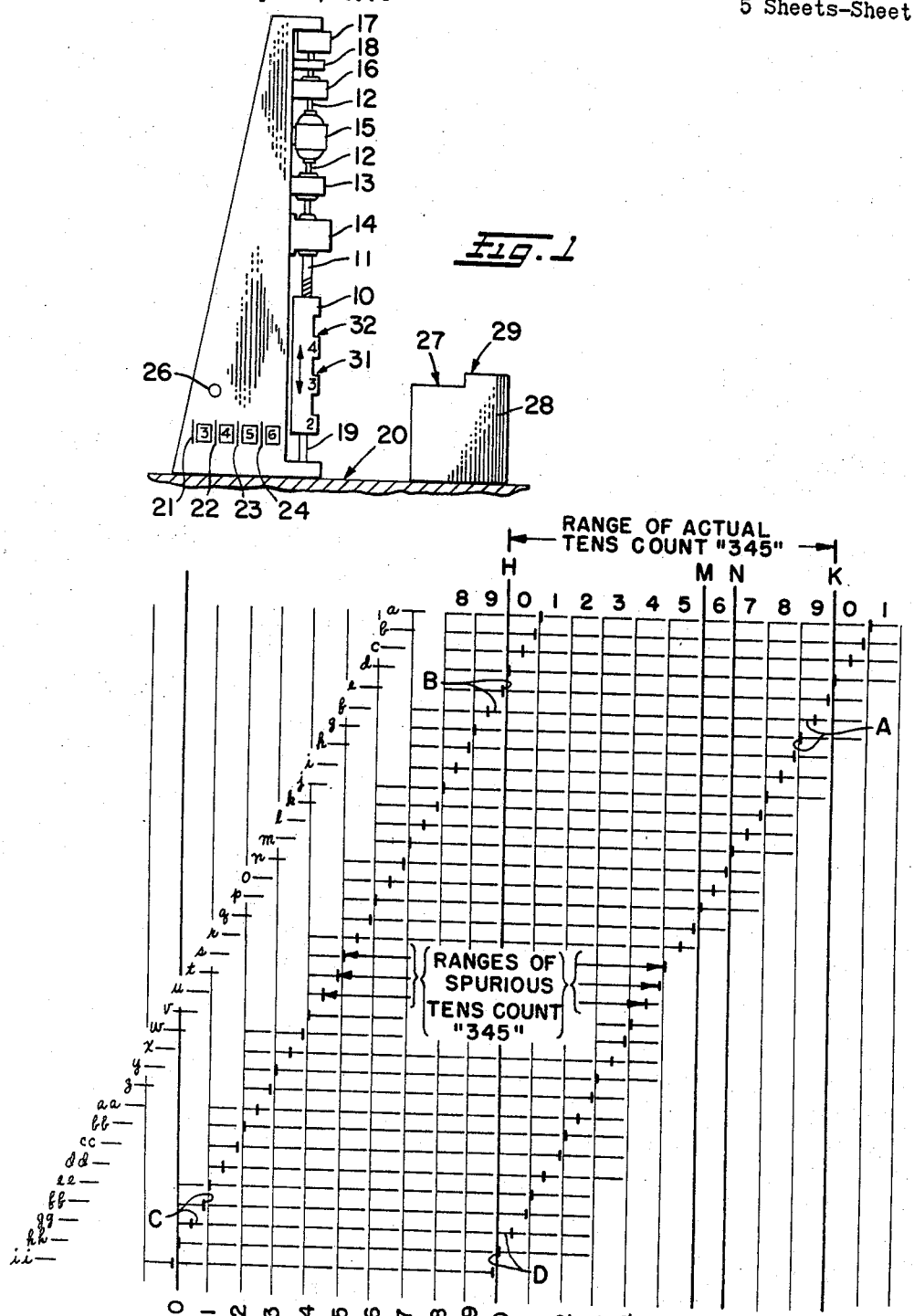

This is a continuation of my co-pending application, Ser. No. 393,999, filed Sept. 2, 1964 (now abandoned).

This invention relates to numerical control systems for rotatively positioning shafts (the shafts may typically constitute slide-driving screws) in gage, machine tool, and other applications.

It is known to use numerical control systems in which the rotative displacement of a shaft from a datum position is measured in numerical terms, in a binary numbering system or in a numbering system of any other desired base, and such measurement number is compared with the number that corresponds to the desired control setting, the comparison establishing an error signal that directly or indirectly provides a basis for corrective control signals to a rotary drive means for the screw. However, systems of this kind have emphasized the use of high performance circuits, with many costly and sophisticated components, including usually solid state elements and subcircuits.

In a number of potential applications for numerical control systems, ease of maintenance and general availability of replacements for the electronic control elements are highly desirable features. In such applications, presently known systems that give sufficient accuracy and speed in service are hard to justify from the cost standpoint. Maintenance costs in particular tend to be unacceptable because maintenance requires the services of highly skilled electronic technicians, or the "package" replacement of very costly solid-state subcircuits and elements which may be available from only one source. As a result, in many gage and machine tool applications, the use of numerical control systems for slide driving screw members has not been compatible with realistic cost control standards.

There is a definite need for reasonably fast numerical control positioning systems that will achieve accurate positioning, but that can be serviced by any person with the skill of a competent electrician—systems that employ readily replaceable control relays and other work-a-day, widely available, easily serviced components. It is an object of the present invention to provide such a system.

The invention may be exploited for example in a master gage application to allow positioning of a master gage block or slide at say any selected one of ten thousand locations spaced at intervals of one ten thousandth of an inch, the positioning at any selected location being accomplished with an accuracy of ±.00001 inch (ten millionths of an inch) and within a time interval of from a fraction of a second to several seconds. By use of a toothed form of master gage slide with say 20 teeth having accurately spaced side faces, it is possible to quickly establish, to such a standard of accuracy, a reference position at any one of say two hundred thousand positions.

This invention has also been used in machine tool applications. For example, it has been employed in boring machines to control (1) translation of a boring head and (2) transport of the machine table.

The numerical control system counts the number of increments of rotative angular displacement of a shaft. In a digital or ten-base system, each increment may correspond to $\frac{1}{10}$ turn of the shaft (36°). In one of its aspects, the invention is characterized by phasing a spurious base count (a tens count in a base ten or decimal numbering system) ahead of the actual base count, and when the spurious base count compares with the base count of the numerical identification, counting a predetermined units count phased ahead of the units count of the numerical identification, and upon achievement of such predetermined units count initiating completion of the shaft movement to finally move the shaft just unto the desired units count in a predetermined rotative direction which may be called the advance direction. Usually this will be chosen to be the direction of rotation corresponding to an increasing numerical count, but it can be chosen to correspond to decreasing numerical count. The "aheadness" or "behindness" of phasing has reference to such chosen direction of rotation, i.e., one condition or event is phased ahead of another if it is the earlier obtaining of the two when the shaft is rotating in the advance direction.

The foregoing and other objects, features, and advantages of the invention will be apparent from the following description of a presently preferred embodiment of the invention.

In the accompanying drawings:

FIGURE 1 is a schematic drawing of an embodiment of the invention. In the particular application illustrated, the invention provides an improved master height gage.

FIGURE 2 is a graph showing various phase relationships between a spurious tens count on the one hand and on the other hand a corresponding actual tens count and various actual unit counts. The graph is in the form of a series of diagrams each showing displacements corresponding to (1) establishment of a given spurious tens count arbitrarily chosen for consideration and (2) contact of a rotary switch brush with one or the other of ten rotary switch contacts corresponding to unit counts 0 to 9, with such items (1) and (2) being related differently in each one of the series of diagrams.

Figure 3A:
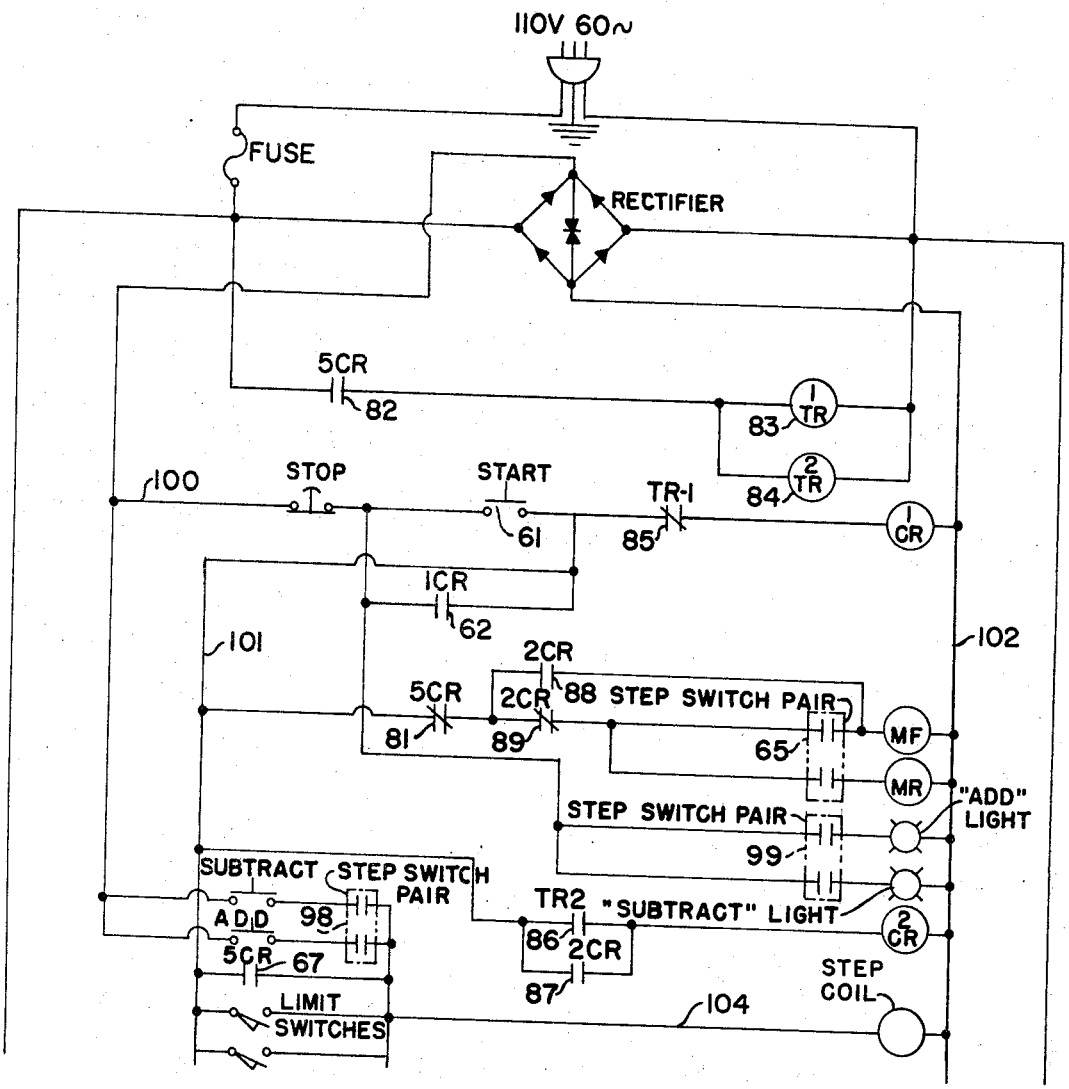

FIGURES 3A, 3B and 3C together show a control and counting circuit illustrating the invention.

FIGURES 4, 5 and 6 are views of a rotary switch. FIGURE 4 is taken on line 4—4 of FIGURE 6. FIGURE 5 is taken on line 5—5 of FIGURE 4. FIGURES 4 and 5 show the housing for the switch in phantom view, while FIGURE 6 is a cross-sectional view of the switch together with its housing.

FIGURE 7 is a view similar to the central portion of FIGURE 3B but including a less abstracted showing of the rotary switch and other elements.

Shown in FIGURE 1 is a master gage, including a gage block 10 that is slide-driven by a screw shaft 11. The shaft 11 is in turn driven by a shaft 12 through a no-slip clutch 13 and a no-backlash speed reducer 14. The shaft 12 is powered by a drive motor 15. The other end of the motor shaft 12 passes through a rotary switch 16 and drives a turn counter 17. If the turn counter is of a type which counts an additional unit count for every one-tenth turn of a shaft, it may be driven from the shaft 12 through a no-backlash speed reducer (e.g. a toothed, tensioned belt drive, not shown) having a one-to-ten reduction ratio so that each additional count of the counter 17 represents a single revolution of the shaft 12. The drive ratios of the speed reducer 14 and the screw of the screw shaft 11 are such that each revolution of the shaft 12 corresponds to ten ten-thousandths of an inch movement of the gage block 10. Therefore each one-tenth of a revolution of the shaft 12 corresponds to one ten-thousandths of an inch movement of the block 10. Therefore each additional count registered by the counter 17 represents ten ten-thousandths of an inch movement of the block 10; and each additional count registered by the rotary switch 16 represents one ten-thousandths of an inch movement of the block 10. Therefore the counter 17 is a tens counter and the rotary switch 16 is a units counter with reference to a count of the number of ten-thousandths of an inch by which the gage block 10 is displaced from a datum position.

An electric brake 18 is provided for stopping the shaft 12. The block 10 slidably moves along the suitable guiding member 19.

In use of the device shown in FIGURE 1, a four-figure setting is made corresponding to the number of ten-thousandths of an inch displacement from datum position that is desired. This setting is made by turning thumbwheel switches 21, 22, and 23 associated with the turn counter 17 and the thumbwheel switch 24 associated with the rotary switch 16. Each of the switches 21–24 may be set at any one of ten positions corresponding to the digital settings 0–9. Each of the thumbwheel switches 21–24 may have an associated window 30 to indicate the setting of the switch, as shown in FIGURE 1. The four windows shown in FIGURE 1 correspond to a setting that calls for positioning of the master block at .3456 inch above datum position.

When this setting is made, the starting switch or button 26 is pressed and the block 10 quickly moves to the desired setting and stops. The top face 31 of the "three" tooth is then located 3.3456 inches above the plane or reference level 20, which may be a machined surface. Correspondingly, the top surface or face 32 of the "four" tooth is located 4.3456 inches above the reference level 20. Only a few teeth are shown in FIGURE 1, but it will be understood that in an actual gage twenty or more teeth may be provided.

The locations of the top faces of the gage block teeth are determined with an accuracy to the nearest ten-millionth of an inch. Therefore the spacing of, for example, the top face of the "three" tooth above the surface 20 when the gage block 10 comes to rest at its preset position can correctly be designated as 3.34560±.00001 inches.

This quickly set high precision measurement can then be transferred to height gages or other transfer instruments in a conventional manner. For example if the height of the face 27 of an object 28 is to be inspected to see that it conforms to the desired height of 3.3456 inches, a height gage is adjusted to cause its dial indicator to indicate zero while its finger engages the face 31, and the gage is then moved to bring its finger into contact with the face 27. The dial indicator of the gage then shows the amount, if any, by which the face 27 exceeds or falls short of the desired height.

The counter 17 may be of a well known type that consists of three rotary switches which here are used for counting respectively thousands, hundreds, and tens of units (the units in this instance being ten thousandths of an inch). These rotary switches may carry numerals which move past viewing windows thereby indicating the count at any given moment. The thumbwheel switches 21, 22 and 23 determine which one contact of each of the three groups of ten contacts associated respectively with the three rotary switches of the counter 17 will become series connected in the counter circuit. When the three chosen contacts of the three rotary switches of the counter 17 are simultaneously closed, the counter closes its circuit and transmits a signal indicating that the preset count then obtains. An example of a suitable commercially available switch of this type is Veeder-Root remote data readout counter No. 1607.

One advantage of the invention is particularly applicable to master gage applications. The master gage shown in FIGURE 1 can be employed for direct inspection of the height between two elevated locations on a workpiece or inspection piece. Thus for example it may be desirable to inspect the vertical height between the faces 27 and 29 on the article 28. Conventionally this is done by measuring the height of each from the reference surface 20. There is much possibility of error because one measurement must be subtracted from the other and the departures from zero of the transfer gage indicator when its finger contacts each of the surfaces 27 and 29 must be properly accounted for in such subtraction. However with the present device it is possible to reset the master gage block to make the face 27 the reference level, and then directly measure the height of face 29 above face 27.

Let us assume for example that face 29 is to be exactly .5000 inch above face 27. The operator sets the switches 21–24 to what he believes to be a figure corresponding to the height of the face 27. He then depresses the button 26 whereupon the face 31 moves up to a position approximately corresponding to that of the face 27. Using a conventional transfer height gage, the operator then transfers the height measurement of face 27 to face 31 and rotates a hand wheel or knob (not shown) fastened to the shaft 12 until the dial indicator of the height gage reads zero at which time the faces 31 and 27 are exactly level. The operator then disengages clutch 13 and sets the thumbwheel switches 21–24 to the reading "0000." The operator then depresses the switch 26 and waits till the shaft 12 comes to rest. The face 27 is now the reference level, and the shaft 12 is now positioned at its new datum rotative position corresponding to this new reference level. The clutch 13 is then re-engaged and the desired height measurement of .5000 is set on the switches 21–24. After the starter button 26 is again depressed and the shaft 12 again comes to rest, the face 31 is located exactly .5000 inch above the new reference level which is the face 27; therefore the face 31 is located at the desired height of the face 29, to the nearest ten-millionth of an inch. How closely the actual height of face 29 conforms with its desired height is then determined by means of a height gage or other transfer means.

As seen in FIGURES 4, 5, and 6, the rotary switch 16 includes a dielectric ring 35 in which are inserted the ten contact members 40–49. Inserted in the opposite side of the dielectric ring 35 is a conducting ring 36. A commutator brush 74 is directly electrically associated with a rotary connector brush 38. The brush 74 contacts the several contacts 40–49 and the connector brush 38 contacts the connecting ring 36. The brushes 74 and 38 rotate with the shaft 12 and are preferably counterweighted as shown so that they are removed from any wiping and conducting contact when the shaft 12 is turning at a high speed. The illustrated screws (FIGURE 6) associated with the ring 36 and with the contacts 40–49 are binding posts for convenient connection of electrical leads. The screws associated with the contacts 40–49 are labeled 70 (see also FIGURE 7). The dielectric ring 35 frictionally engages the side of the stationary rotary switch mounting 39 in such a way that the rotative position of the ring 35 with respect to the stationary housing can be adjusted to thereby adjust the stationary positions of the contacts 40–49.

As the "leading" edge 34 of each of the contacts 40–49 is contacted by the commutator brush 74, the unit count associated with the particular contact is established. Thus as the commutator 74 contacts the leading edge 34 of the contact 40 a unit count of zero is established. As it contacts the leading edge 34 of contact 41, a count of one is established. As it contacts the "leading" edges of contacts 42–49, counts of from two to nine, respectively, are established. In calibrating the device, the ring 35 is rotatably adjusted within and with respect to its mounting socket so that the contact of the commutator 74 with the leading edge 34 of the zero contact 40 occurs when the top faces of the teeth of the block 10 are spaced exactly .0010 inch, or some multiple thereof, above the reference surface 20. This corresponds to an angular spacing of the rotative position of the shaft 12 from datum position by an angular distance of exactly 360°, or some multiple thereof.

A control circuit is arranged to stop the shaft 12 at any one of ten thousand angular distances of from zero degrees to 359,964 degrees (360,000 degrees minus 36 degrees) from datum position. These ten thousand different angular distances correspond to ten thousand increments of angular displacement of the shaft 12 from datum position.

An angular distance corresponding to twenty increments of angular displacement is graphed in FIGURE 2. Line H in FIGURE 2 corresponds to an angular distance from datum position of exactly 3450 increments. Line K represents an angular distance from datum position of exactly 3460 increments. More precisely, the line H indicates that the leading edge of the commutator brush 74 is displaced in degrees exactly 3450 times 36 from the position it occupies at the datum position of the shaft 12.

The repetitive pattern of short horizontal lines in FIGURE 2 represents the short ranges of angular distances (units count ranges) through which contact of the commutator brush 74 is established with each of the contacts 40–49 which correspond, respectively, to unit counts of from zero to nine. It will be seen that the range of contact of the zero contact commences precisely at line H and again, 360 degrees later, precisely at line K. This precise registry is accomplished by the above-described adjustment of the dielectric ring 35 within the housing 39.

Since lines H and K each represent a spacing from datum position that is some multiple of exactly ten increments of angular distance, and since lines H and K represent angular positions that are displaced from each other by exactly ten increments of angular distance, it will be understood that the zone between lines H and K represents the range of angular distances through which there actually obtains the selected tens count, namely, tens count "345" in the illustrated instance. However according to the invention, the tens counter 17 is phased ahead of the actual tens count, as by suitable adjustment of the angular position of the housing of the tens counter 17 with respect to its driving shaft. In FIGURE 2 the pairs of short vertical lines in subfigures a to ii represent the limits of the ranges through which spurious tens counts of "345" obtain at various adjustments of the tens counter 17. The horizontal distance between each pair of vertical lines corresponds to the distance between the lines H and K in the case of an ideal counter that maintains a given tens count until the exact moment that the succeeding tens count is established, without any intervening gap or overlap. To the extent that commercial counters are not capable of realizing this ideal, the angular range of the tens counter may be slightly restricted so as to bring the pairs of corresponding vertical lines slightly closer together. This would have no serious effect on the operation of the control system, as will become apparent.

Assuming now the idealized tens counter, subfigure a of FIGURE 2 illustrates a condition where the spurious tens count is phased exactly one unit count behind the actual tens count. In subfigures b and c, the phasing of the spurious tens count is phased progressively fewer degrees behind the actual tens count. In subfigure d the spurious tens count and the actual tens count are exactly in phase. In subfigures e, f, g, etc. continuing to subfigure ii, the spurious tens count is phased progressively further ahead of the actual tens count. In subfigure g the spurious tens count is phased exactly one increment ahead of the actual tens count; and in subfigure h it is phased slightly more than one increment ahead. In subfigure ee it is phased exactly nine full increments ahead of the actual tens count. In subfigure ff it is phased slightly more than nine full increments ahead. Turn counter 17 should be adjusted so that the phase relationship is somewhere between that represented by subfigure h and that represented by subfigure ee, as more fully explained later herein.

A control circuit contemplated by the invention is shown in FIGURES 3A, 3B, and 3C. FIGURE 7 is a less abstracted view of the center portion of FIGURE 3B, and includes a more concrete showing of the thumbwheel switches 21–24, the turn counter 17, and the rotary switch 16. In FIGURE 7 it will be understood that each of the ten contact points of each of the thumbwheel switches 21–24 is each connected to its own one contact of the ten contacts of its associated counter switch, each interconnected pair of thumbwheel and counter contacts being at corresponding locations in their circular arrays.

In FIGURES 3 and 7, the associations of particular switches with particular operating relays is indicated in the conventional manner. Normally open and normally closed switches are also indicated conventionally.

The operation of the illustrated control circuit will now be described. Assume that the desired angular displacement of the shaft 12 is 3456 increments from datum position. The operator sets 3456 on the thumbwheel switches 21–24. This is done by setting the switches 21–24 at contacts 53, 54, 55, and 56, respectively. The operator then momentarily closes the start switch 61. Relay 1CR is thereby energized and is held by holding switch 62. A circuit is thereby completed through leads 101 and 102 and either the motor forward switches 63 or the motor reverse switches 64. The motor starts.

The alternative closing of the switches 63 and 64 is controlled by the alternatively energized relays MF and MR. Their energization is in turn determined by the step switch pair 65, which amounts to a single-pole double-throw switch whose throw is reversed with each energization of the illustrated step coil. The circuit through lead 104 and the step coil is normally interrupted.

Assume that the actual initial shaft displacement is something less than the desired 3456 increments and that the motor starts running in the forward or upcounting direction. The tens counter 17 includes commutators 71, 72, and 73 for counting, respectively, thousands, hundreds, and tens. When the commutators 71, 72, and 73 are respectively at contacts that are paired with the contacts 53, 54, and 55 of the thumbwheel switches, there obtains the spurious tens count corresponding to the desired setting. A circuit is thereby completed through the leads 105 and 106 and the relay 5CR is energized, but only momentarily because the shaft 12 is rotating at fairly high speed and cannot be stopped within the range of a single tens count—the relatively short range that is represented by the horizontal distance between the pair of short vertical lines in FIGURE 2. Accordingly, as soon as the range of the particular tens count (a tens count of 345) is passed, the circuit through the leads 105 and 106 is again interrupted as the tens count commutator 73 passes away from the contact associated with the thumbwheel switch contact 55.

During its brief energization, the relay 5CR briefly applies the electric brake by briefly closing the switch 66. Switch 67 is also momentarily closed to pulse the step coil and reverse the throw of the single-pole double-throw switch constituted by the step switch pair 65, to thereby energize the motor reverse relay MR. This opens the switches 63 and closes the switches 64, causing the motor to reverse.

The momentary actuation of relay 5CR also closes switch 68, energizing relay 3CR which is held by switch 69. Energizing of relay 3CR opens switches 71 and 72 and closes switches 73 and 74, thereby taking the motor armature out of the circuit of leads 101 and 102 and placing it in a circuit that includes the leads 111 and 112 and that bypasses the rectifier shown at the top of FIGURE 3A. This latter circuit includes the elements and subcircuits shown at the lower left of FIGURE 3C to establish in a known manner a low-speed high-torque drive of the motor.

Energizing and holding of relay 3CR further establishes an open position of the switch 75. This2 means that the output of the tens counter will no longer be directly connected to relay 5CR through lead 106, but can only reach relay 5CR through the unit counter circuits to be described below.

Thus the first brief energization of relay 5CR applies the brake momentarily, reverses the motor, establishes the low-speed high torque drive of the motor, and makes the next energization of relay 5CR dependent upon the unit counter circuit.

At this point the further operation of the particular circuit that is illustrated may proceed in two different modes depending on whether the selected units digit is zero or another number. Since we have assumed that the selected units digit is the number six, we will first describe the mode of operation associated with selection of a units number other than zero. The shaft 12, now moving slowly and in the reverse or downcounting direction, creeps back to the range of the spurious tens count "345." When it reaches this range, it continues its slow movement until the commutator 74 of the rotary switch or units counter 16 reaches the "0" contact, that is, the contact 40 shown in FIGURE 3B. It should be borne in mind that the commutator 25 of the thumbwheel switch 24 is set at the contact 56 shown in FIGURE 3B. Since switches 76 and 78 are closed, contact of the commutator 74 with the contact 40 establishes a circuit through lead 105, switch 76, commutator 74 and switch 78. As relay 5CR is reenergized, the brake 18 is again applied. Simultaneously the motor is turned off because the normally closed switch 81 opens, thereby de-energizing both the MF relay and the MR relay and opening both of the switches 63 and also both of the switches 64. Since the shaft has been creeping at a slow speed, it stops before the commutator 74 passes over the contact 40. Therefore, the relay 5CR remains energized for the time being. This causes the switch 82 to remain closed for a sufficient period of time to allow the timer relay 84 to time out and operate the associated switch 86. The other timing relay 83 has a longer timing interval and does not operate for the time being. When the switch 86 closes, relay 2CR is energized, and switch 87 is closed to hold relay 2CR. Energization of relay 2CR closes switch 88 and opens switch 89, which, so to speak, overrides the step coil and the step switch pair 65, and determines that the MF relay and not the MR relay will be energized as the switch 81 closes. Energization of relay 2CR also opens switch 90 and closes switch 91 thereby, so to speak, taking the tens counter 17 out of the control circuit and establishing through switch 91 a connection of the units counter 16 together with its associated thumbwheel switch 24 into the control circuit in a manner that is independent of the tens counter 17. Opening of the switch 90 interrupts the circuit through tens counter 17, commutator 74, and switch 78 to relay 5CR, de-energizing this relay. Switch 66 opens and the brake 18 releases. Switch 81 closes and through now-closed switch 88, the MF relay is energized and the motor moves forwardly. The commutator 74 therefore moves from contact 40 slowly across contacts 41, 42, 43, 44 and 45. At the instant that it reaches the "leading" edge of contact 46, a circuit is established through switch 91, commutator 25, contacts 56 and 46, commutator 74, the now-closed switch 92, and relay 6CR. Energization of relay 6CR closes switch 93, establishing that relay 6CR will remain energized so long at switch 91 remains closed. Energization of relay 6CR also closes switch 94 thereby re-energizing relay 5CR by establishing a direct connection from lead 101 to relay 5CR. Brake 18 is thereupon re-applied and the motor is de-energized by reopening of switch 81. All this occurs before the commutator 74 has advanced beyond the "leading" edge of contact 46 as much as five or six degrees. Therefore when the shaft 12 is brought to a stop, it is at a position corresponding to a position between the lines M and N in FIGURE 2, but closer to M than to N, in fact not more than a fifth of the way from M to N. Since the relay 5CR is energized, the switch 82 closes again causing the timer relay 84 to become energized after its timing interval. However this has no new effect since relay 2CR is already energized and holding and relay 5CR is now energized through switch 94 and independently of switch 78. Accordingly switch 82 remains closed for an additional period of time sufficient to allow the timer relay 83 to exhaust its relatively long timing interval, say three seconds, after which interval switch 85 opens, de-energizing relay 1CR whose holding switch 62 then opens. Opening of switch 62 also interrupts the connection between the power supply lead 100 and the lead 101 thereby de-energizing all the remaining control relays and re-establishing the initial conditions of the control circuit.

We assumed in the above description that the motor started in the forward or upcounting direction. A pair of limit switches may be provided at each end of the limit of travel of the shaft 12. Such switches are shown in FIGURE 3A. If the shaft 12 starts in the wrong direction (in this instance, the downcounting direction), the motion of the gage block 10 will eventually close one of the limit switches thereby pulsing the step coil and actuating the step switch pair 65 to reverse the motor.

In the above description it was assumed that the desired shaft displacement was greater than the initial shaft displacement. Should the desired shaft displacement be less than the initial displacement, the operation of the device will be similar to that described above. The shaft 12 as it turns in the reverse direction, either with or without having been reversed by closing of one of the limit switches, passes through the range of the spurious tens count corresponding to the desired setting and continues in the downcounting direction as the brake 18 is applied, the motor is reversed, and a low-speed high-torque motor drive is established. It then creeps in the upcounting direction until commutator 74 contacts the contact 40 and stops. However when it next moves it continues in the upcounting direction because at this stage the timer 84 has activated relay 2CR which in turn has closed switch 88, thus overriding the motor reversing control action of the step switch pair 65. It reaches the leading edge of contact 46 and the shaft stops and the initial conditions of the control circuit are re-established, as previously described.

We have now described the operation of the control circuit assuming that the desired shaft displacement is 3456 increments and that the initial shaft displacement is something less than 3456 increments. We have also described the operation when the desired shaft displacement is 3456 increments and the initial shaft displacement is something greater than 3456 increments. Let us now assume that the desired shaft displacement is such that the units digit will be zero. Let us assume that the desired shaft displacement is 3450 increments. This is set by positioning the commutator 25 of the thumbwheel switch 24 on contact 50. The thumbwheel switch 24 is mechanically arranged so that at this position, and only at this position, a mechanical switch 95 is closed to interconnect the leads in which are respectively located the relay operated switches 90 and 77.

When the starting button 61 is closed the motor rapidly turns the shaft until, with or without an intervening reversal caused by closure of one of the limit switches, the shaft passes for the first time through the range of the spurious tens count of "345." The operation of the control circuit to this stage is exactly as it is when the units increment is other than zero. The first brief energization of relay 5CR again applies the brake momentarily, reverses the motor, establishes the low-speed high-torque drive of the motor, and makes the next energization of the relay 5CR dependent upon the unit counter circuit.

The shaft 12, now moving slowly and, let us say, in the downcounting direction, creeps back to the range of the spurious tens count of "345." It will be seen in FIGURE 2 that if the spurious tens count range is phased ahead of the actual tens count at least to the extent shown in subfigure 2h, the spurious tens count range is not reached at the actual count of 3459. Accordingly as the commutator passes over contact 49 at the actual count of 3459, commutator 73 of the tens counter has not yet touched the contact corresponding to contact 55 of the thumbwheel 23. The commutator 74 continues its relatively slow movement across the rotary switch contacts 48, 47, etc. As it is continuing towards the "zero" unit contact 40, the spurious tens count range "345" is entered as the commutator 73 of the tens counter touches the contact corresponding to contact 55 of the thumbwheel 23. Since the mechanical switch 95 is closed, relay 4CR becomes energized, thus opening switch 76 and closing switch 97. Accordingly when the commutator 74 reaches the contact 40 that switch 76 is opened and the relay 5CR is not energized and the commutator 74 therefore continues in a downcounting direction beyond the desired units count of zero and again touches contact 49 which corresponds to a units count of nine and that, as can be seen from for example subfigure h of FIGURE 2, is phased ahead of the actual tens count. When commutator 74 touches contact 49 the spurious tens count of "345" still obtains. Since the switch 97 is closed, the relay 5CR is energized as commutator 74 touches contact 49. Since the shaft has been creeping at a slow speed it stops before the commutator 74 passes over the contact 49. Therefore the relay 5CR remains energized for the time being. The timer relay 2TR times out, closing switch 86 which in turn energizes relay 2CR which is then held by switch 87.

Energization of relay 2CR opens switch 77 thereby interrupting energization of relay 4CR which in turn causes switch 76 to close and switch 97 to open. Energization of relay 2CR also closes switch 88 and opens switch 89 to override the step switch pair 65 and assure that the next subsequent operation of the motor will be in the forward direction. Also, switch 90 opens and switch 91 closes, thereby taking the tens counter out of the control circuit and establishing through switch 91 a connection of the units counter 16 together with its associated thumbwheel switch 24 into the control circuit in a manner that is now independent of the tens counter 17. Opening of the switches 90, 97 and 78 de-energizes relay 5CR. Switch 66 opens and the brake 18 releases. Switch 81 closes and through now-closed switch 88, the MF relay is energized and the motor woves forwardly. The commutator 74 therefore moves from contact 49 toward contact 40. At the instant it reaches the "leading" edge of contact 40, a circuit is established through switch 91, contact 50, contact 40, commutator 74, and now-closed switch 92 to relay 6CR. Energization of relay 6CR closes switch 93, establishing that relay 6CR will remain energized so long as switch 91 remains closed. Energization of relay 6CR also closes switch 94 thereby re-energizing relay 5CR. Brake 18 is thereupon re-applied and the motor is de-energized by reopening of switch 81 and de-energizing of both the MF and MR relays. All this occurs before the commutator 74 has advanced beyond the "leading" edge of contact 40 as much as a fifth of the way to the leading edge of the contact 41. Since the relay 5CR is energized, the switch 82 closes again causing the timer relay 84 to become energized after its timing interval. However this has no new effect since relay 2CR is already energized and holding and relay 5CR is now connected through switch 94 and independently of switch 78. Accordingly switch 82 remains closed for an additional period of time sufficient to allow the timer relay 83 to exhaust its relatively long timing interval (say three seconds) whereupon switch 85 opens, de-energizing relay 1CR whose holding switch 62 then opens. Opening of switch 62 interrupts the connection between the power supply lead 100 and the lead 101 thereby de-energizing all the remaining control relays and re-establishing the initial conditions of the control circuit.

Assume now that with a desired units count of zero the desired shaft displacement is less than the initial shaft displacement. The shaft 12 as it turns in the downcounting direction, either with or without having been reversed by closing of one of the limit switches, passes through the range of the spurious tens count 345 and continues in the downcounting direction as the brake 18 is applied, the motor is reversed and a low-speed high-torque motor drive is established. The shaft then creeps in the upcounting direction until the commutator 74 contacts the contact 49 corresponding to a units count of "9" that is phased ahead of the actual tens count "345" corresponding to the desired setting. Relay 5CR is energized through now-closed switch 97, the shaft stops, timer 84 times out, relay 2CR is energized, relay 4CR is de-energized, switch 76 closes and switch 96 opens, all as previously described.

Now when the commutator next moves, it continues in the upcounting direction because at this stage the timer 84 has activated relay 2CR which in turn has closed switch 88, thus overriding the motor reversing control action of the step switch pair 65. The commutator 74 reaches the leading edge of contact 40, and the shaft stops and the initial conditions of the control circuit are re-established, as previously described.

Step switch pairs 98 and 99 are provided and are controlled by the step coil in the same manner as step switch pair 65. As viewed in FIGURE 3A, the lower switches of the step switch pairs 65, 98 and 99 all close and open together and the upper switches all close and open together. As the step coil is successively pulsed, closing of the lower group of switches and closing of the upper group of switches occur alternately. If for example the operator sees that the "subtract" light is on, but knows that the count is to be increased, he can push the "add" button. The lower switch of the pair 98 will be closed and therefore pressing of the "add" button will energize the step coil, causing the bottom switch of each step switch pair to open, and the top switch of each pair to close. Then when the start button 61 is pushed, the motor will start in the forward or upcounting direction. This saves time, because the motor otherwise would start and run in the wrong direction until the closing of a limit switch at one extreme of the shaft or screw travel caused the motor to reverse to the correct direction.

As mentioned previously, turn counter 17 should be adjusted so that the phase relationship is somewhere between that repreesnted in FIGURE 2 by subfigure h and that represented by subfigure ee. Unless the adjustment is between these limits, the numerical control system may malfunction for any one of several different reasons.

Any overlap between the "9" unit count range and the "345" spurious tens count range as at region A in FIGURE 2 may lead to an error when the control system is asked to downcount to a setting having a units count of zero. Also, without at least some overlap, as indicated at region B, between the "9" unit count range and the "345" spurious tens count range, the control system may malfunction when asked to upcount to a units count of zero. In FIGURE 2 in moving from subfigure a progressively down to subfigure g, it will be noted that the error-producing overlap at region A first disappears at subfigure g or possibly at subfigure h. It will be noted that the necessary overlap at region B first occurs at either subfigure e or subfigure f.

The overlap between the "0" unit count range and the "345" spurious tens count range as at region C in FIGURE 2 may lead to an error when the control system is upcounting to a unit count other than zero. Also, with-between the "0" unit count range and the "345" spurious tens count range, the control system may malfunction when downcounting to a unit count other than zero. In FIGURE 2, in moving from subfigure *ii* upwardly toward the higher subfigures, it will be noted that the error-producing overlap at region C first disappears at subfigure *ff* or possibly not until subfigure *ee*. In FIGURE 2, moving upwardly from subfigure *ii* toward the higher subfigures, the necessary overlap at region D first appears at subfigure *hh* or possibly at subfigure *gg*.

The invention is not restricted to the slavish imitation of each and every one of the details described above which have been set forth merely by way of example with the intent of most clearly setting forth the teaching of the invention. Obviously devices may be provided which change, eliminate or add certain specific structural details without departing from the invention.

What is claimed is:

1. In a numerical control system for rotatably positioning a shaft, rotary drive means drivingly connected through linkage means to said shaft, count comparison control means for positioning said shaft at a selected numerically identified angular displacement from datum position, said displacement being identified as the number of whole discrete increments of rotative angular displacement of said drive means from datum position in a given rotative direction, said count comparision control means including: input switch means for selecting said numerical identification, feedback switch means operable by movement of said rotary drive means registering the angular displacement of said rotary drive means from datum position, said input switch means and said feedback switch means each including a tens count switch and a units count switch, each of the discontinuity transfer type, said feedback tens count switch being phased in advance of the actual tens count of said increments of said feedback units count switch by a phase distance corresponding to not less than one and not more than nine units to provide a spurious tens count, said feedback units count switch registering the actual units count of said increments, means responsive to coincidence between the tens count called for by the setting of said input switch means and the spurious corresponding tens count of the tens count switch of said feedback switch means to initially signal when said shaft is at a position corresponding to said spurious tens count at a predetermined units count that is determined by but different than the actual units count called for by the setting of said input switch means, said predetermined units count being, for every units count setting of said input switch means, phased ahead of the called-for units count, and count completion means operative upon said initial signalling to finally angularly displace said shaft toward said selected numerically identified angular displacement and stop said shaft upon coincidence of the units count in said feedback switch means with the units count called for by the setting of said input switch means.

2. A device as in claim 1 in which said input switch means for selecting said numerical identification includes switch means for selecting a predetermined units count that is phased ahead of the actual tens count for a numerical identification having the lowest units count and that is not phased ahead of the actual tens count for a numerical identification other than the lowest units count.

3. A device as in claim 1 in which said input switch means for selecting said numerical identification includes switch means for selecting a predetermined units count that is phased ahead of the actual tens count for a numerical identification having the lowest units count and that is not phased ahead of the actual tens count for a numeri-identification other than the lowest units count.

4. A device as in claim 1, including clutch means in said linkage means for selectively establishing and disestablishing a driving relationship from said drive means to said shaft, whereby an arbitrary position of said shaft may be established as the datum position of the shaft by disengaging said clutch and selecting the numerical identification corresponding to datum position, allowing said count comparison control means to accomplish their count while said clutch is disengaged and said shaft is in said arbitrary position, and then when said drive means is stopped upon accomplishment of said count, re-engaging said clutch.

References Cited
UNITED STATES PATENTS

| | | | |
|---|---|---|---|
| 3,034,715 | 5/1962 | Wagner | 235—132 |
| 3,071,028 | 1/1963 | Wagner | 33—125 X |

STEPHEN J. TOMSKY, *Primary Examiner.*

UNITED STATES PATENT OFFICE
CERTIFICATE OF CORRECTION

Patent No. 3,346,183                      October 10, 1967

Albert R. Ludwig

It is hereby certified that error appears in the above numbered patent requiring correction and that the said Letters Patent should read as corrected below.

Column 1, line 21, for "onto" read -- unto --.

Signed and sealed this 10th day of December 1968.

(SEAL)
Attest:

Edward M. Fletcher, Jr.                      EDWARD J. BRENNER
Attesting Officer                             Commissioner of Patents